United States Patent [19]
Sasaki

[11] Patent Number: 4,685,869
[45] Date of Patent: Aug. 11, 1987

[54] DEVICE FOR SUPPORTING NOZZLE VANES OF A TURBOCHARGER

[75] Inventor: Shoji Sasaki, Mishima, Japan

[73] Assignee: Toyota Jidosha Kabushiki Kaisha, Toyota, Japan

[21] Appl. No.: 783,648

[22] Filed: Oct. 3, 1985

[30] Foreign Application Priority Data

Oct. 4, 1984 [JP] Japan .................. 59-149554[U]

[51] Int. Cl.$^4$ .............. F04B 17/00; F01D 25/26; F03D 7/00
[52] U.S. Cl. ..................... 417/407; 415/134; 415/163; 415/164
[58] Field of Search ............... 60/600, 602; 417/405, 417/406, 407; 415/163, 164, 134; 384/278

[56] References Cited

U.S. PATENT DOCUMENTS

| | | | |
|---|---|---|---|
| 2,854,210 | 9/1958 | Bachle | 415/164 |
| 2,930,579 | 3/1960 | Boyd et al. | 415/163 |
| 3,033,519 | 5/1962 | Radtke | 417/407 |
| 3,069,070 | 12/1962 | Macaluso et al. | 415/163 |
| 4,355,953 | 10/1982 | Nelson | 415/164 |

FOREIGN PATENT DOCUMENTS

| | | | |
|---|---|---|---|
| 200707 | 5/1958 | Austria | 415/163 |
| 58-82439 | 6/1983 | Japan . | |
| 58-130030 | 9/1983 | Japan . | |
| 351992 | 5/1961 | Switzerland | 415/163 |

Primary Examiner—Louis J. Casaregola
Assistant Examiner—Timothy S. Thorpe
Attorney, Agent, or Firm—Cushman, Darby & Cushman

[57] ABSTRACT

A turbocharger comprising a central housing which has at one end a radially outwardly extending annular flange. A backplate is arranged between the center housing and the turbine wheel. The outer peripheral portion of the backplate is held between the annular flange and the turbine housing. Nozzle vanes are arranged in the exhaust gas inlet passage formed between the backplate and the turbine housing. Bush insertion bores are formed in the backplate and the annular flange. Bushes are axially and movably inserted into the bush insertion bores. The axial movement of the bushes is restricted by stop means. The shafts of the nozzle vanes are rotatably supported by the bushes.

11 Claims, 8 Drawing Figures

DEVICE FOR SUPPORTING NOZZLE VANES OF A TURBOCHARGER

BACKGROUND OF THE INVENTION

1. Field of the Invention

The present invention relates to a device for supporting nozzle vanes of a turbocharger for use in an internal combustion engine.

2. Description of the Related Art

To ensure a supercharging operation over a wide range of engine operating conditions, a turbocharger is known in which a plurality of nozzle vanes are arranged in the annular exhaust gas inlet passage formed around the turbine wheel, and the rotation of the nozzle vanes is controlled in response to a change in the engine operating condition (Japanese Unexamined Utility Model Applications No. 58-82439 and 58-130030). In this turbocharger, a radially outwardly extending annular flange is formed on one of the axial ends of the center housing, and a backplate is arranged between the turbine wheel and the above-mentioned one axial end of the center housing. The outer periphery of the backplate is held between the turbine housing and the annular flange of the center housing. A plurality of the nozzle vanes are arranged in the annular exhaust gas inlet passage formed between the backplate and the turbine housing. The shafts of the nozzle vanes extend through the backplate and the annular flange of the center housing and project from the annular flange. A plurality of bushes for supporting the shafts of the nozzle vanes are firmly fitted into corresponding bores formed in the backplate and the annular flange of the center housing. These bushes have an increased diameter portion, and axial movement of the bushes is prevented by firmly supporting the increased diameter portion of the bushes between the backplate and the annular flange of the center housing.

In this turbocharger, when the engine is operating, the nozzle vanes are directly exposed to exhaust gas having a high temperature. Consequently, at this time, the temperature of the nozzle vanes becomes high and, accordingly, the temperature of the bushes supporting the shafts of the nozzle vanes also becomes high. As a result, the bushes expand in both the axial and radial directions. However, in this turbocharger, since the increased diameter portion of the bushes is firmly held between the backplate and the annular flange of the center housing, the increased diameter portion of the bushes cannot freely expand and, as a result, thermal stress occurs in the increased diameter portion of the bushes. Consequently, in this turbocharger, thermal stress occurs repeatedly in the increased diameter portion of the bushes due to repeated stopping and starting of the engine. As a result, if the turbocharger is used for a long time, problems occur in that the bushes become deformed and thereby hinder the smooth rotation of the nozzle vanes, and that the increased diameter portion of the bushes is damaged due to metal fatigue and, as a result, the bushes are dislodged from the bush insertion bores.

SUMMARY OF THE INVENTION

An object of the present invention is to provide a nozzle vane supporting device capable of maintaining a smooth rotation of the nozzle vanes for a long period of operation.

According to the present invention, there is provided a turbocharger comprising: a center housing having a radially outwardly extending annular flange at one end thereof; a turbine housing fixed to the annular flange and having an exhaust gas inflow chamber therein; a turbine wheel rotatably arranged in the turbine housing; a radially outwardly extending backplate arranged between the turbine wheel and said one end of the center housing and having an outer peripheral portion held between the annular flange and the turbine housing; an annular exhaust gas inlet passage formed between the backplate and the turbine housing and extending radially inwardly from the exhaust gas inflow chamber toward the turbine wheel; a plurality of guide vanes rotatably arranged in the annular exhaust gas inlet passage, each of the guide vanes having a shaft which extends through both the backplate and the annular flange and projects into an exterior of the annular flange, the annular flange having a plurality of first bores formed therein around the shafts, the backplate having a plurality of second bores formed therein around the shafts, each of the first bores being aligned with the corresponding second bore; a plurality of bushes each being axially and movably inserted into at least one of the corresponding first bores and the corresponding second bore and rotatably supporting the corresponding shaft therein; and stop means cooperating with the bushes and permitting the bushes to move freely in an axial direction thereof by a fixed distance.

The present invention may be more fully understood from the description of preferred embodiments of the invention set forth below, together with the accompanying drawings.

DESCRIPTION OF THE PREFERRED EMBODIMENTS

Figure 1:
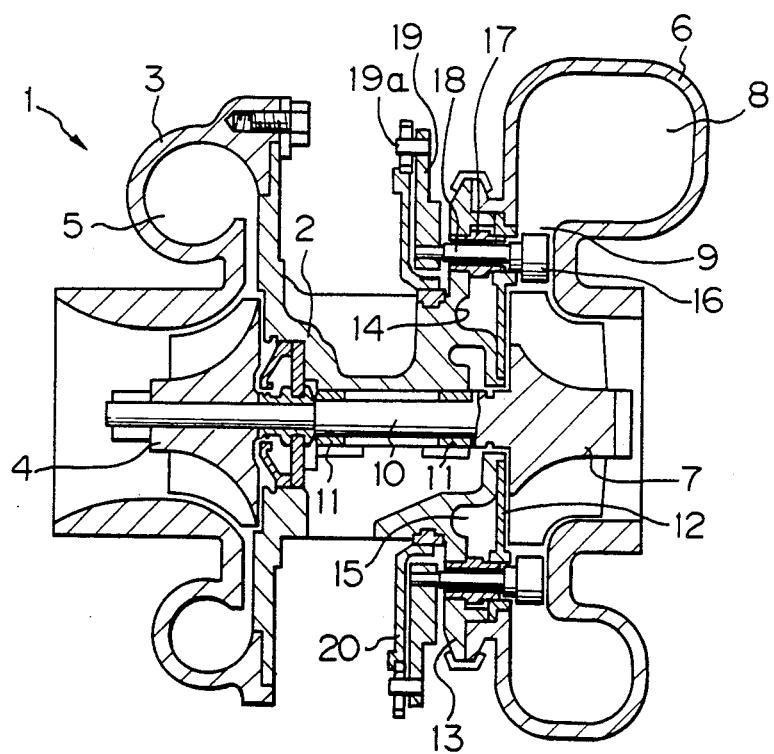
FIG. 1 is a cross-sectional side view of a first embodiment of a turbocharger according to the present invention.

Referring to FIG. 1, reference numeral 1 designates a turbocharger, 2 a center housing, 3 a compressor housing, and 4 an impeller; 5 designates a compressed air discharge chamber, 6 a turbine housing, 7 a turbine wheel arranged in the turbine housing 6, and 8 an exhaust gas inflow chamber; 9 designates an annular exhaust gas inlet passage extending from the exhaust gas inflow chamber 8 to the outer peripheral portion of the turbine wheel 7, and 10 a rotary shaft rotatably supported by the center housing 2 via bearings 11. The turbine wheel 7 is integrally formed on one of the ends of the rotary shaft 10, and the impeller 5 is fixed to the other end of the rotary shaft 10. The compressed air discharge chamber 5 is connected to the intake manifold of the engine (not shown), and the exhaust gas inflow chamber 8 is connected to the exhaust manifold of the engine (not shown). The exhaust gas discharged from the engine is introduced into the exhaust gas inflow chamber 8, and then introduced to the turbine wheel 7 through the exhaust gas inlet passage 9. This exhaust gas provides the rotational force for the turbine wheel 7 and is then discharged to the outside air. Air compressed by the rotation of the impeller 4 is introduced into the engine cylinders (not shown) via the compressed air discharge chamber 5.

As illustrated in FIG. 1, an annular backplate 12 is arranged between the center housing 2 and the turbine wheel 7, thus isolating the center housing 2 from the turbine wheel 7. One end of the center housing 2 is provided with an annular flange 13, which projects radially outwardly therefrom, the outer peripheral portion of the backplate 12 being firmly held between the annular flange 13 and the turbine housing 6. An annular recess 14 is formed on the end faces of the center housing 2 and the annular flange 13, facing and covered by the backplate 12. The annular recess 14 thus defines a heat insulation space 15 between the center housing 2 and the backplate 12 and between the annular flange 13 and the backplate 12. The outer peripheral portion of the backplate 12 extends radially outwardly beyond the outer peripheral edge of the turbine wheel 7, thus forming the exhaust gas inlet passage 9 between the backplate 12 and the turbine housing 6.

Figure 2:
FIG. 2 is a cross-sectional view of a nozzle vane.

A plurality of nozzle vanes 16 are equiangularly arranged in the exhaust gas inlet passage 9. These nozzle vanes 16 have a wing shaped cross-section, as illustrated in FIG. 2. Shafts 18 of the nozzle vanes 16 extend through the backplate 12 and project beyond the exterior surface of the annular flange 13. The shafts 18 are rotatably supported by corresponding bushes 17. Levers 19 are fixed to the projecting end portions of the shafts 18, and a rotary ring 20 rotatably mounted on the center housing 2 is engaged with pins 19a fixed to the tips of the levers 19. Thus, when the rotary ring 20 is rotated, the levers 19 are rotated and, thereby, the nozzle vanes 16 are rotated.

Figure 3:
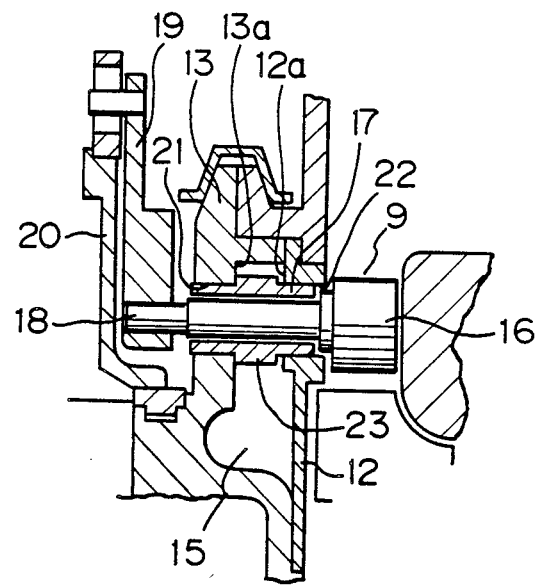
FIG. 3 is an enlarged cross-sectional side view of a portion of the turbocharger illustrated in FIG. 1.
Figure 4:
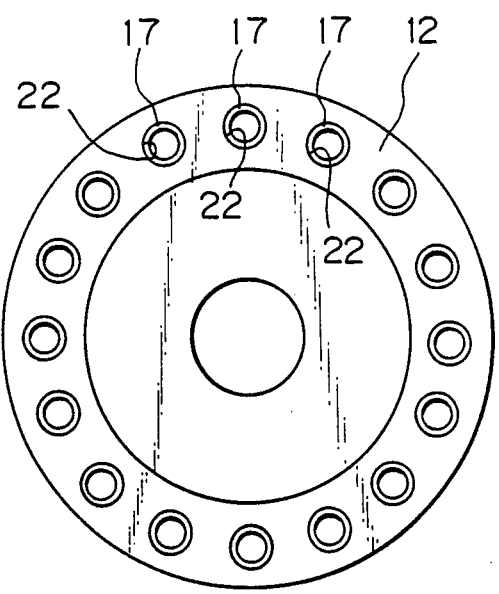
FIG. 4 is a front view of a backplate.

As illustrated in FIG. 3, bush insertion bores 21 are formed in the annular flange 13, and separate bush insertion bores 22 aligned with the corresponding bush insertion bores 21 are formed in the backplate 12. Each bush 17 extends within the bush insertion bores 21, 22 and within the heat insulation space 15 so that one end of each bush 17 is fitted into the bush insertion bore 21 and the other end of each bush 17 is fitted into the bush insertion bore 22. As illustrated in FIG. 4, the bush insertion bores 22 are equiangularly formed in the backplate 12, and each bush 17 is fitted into the corresponding bush insertion bore 22.

As illustrated in FIG. 3, an increased diameter portion 23 is formed on the central portion of the outer peripheral wall of the bush 17, and this central portion is exposed to the heat insulation space 15. The annular flange 13 and the backplate 12 have vertically extending inner wall portions 13a and 12a, respectively, located at each end of the increased dismeter portion 23, and the increased diameter portion 23 has an axial length slightly shorter than the distance between the inner wall portion 13a of the annular flange 13 and the inner wall portion 12a of the backplate 12. These inner wall portions 13a and 12a function as stop members which allow a fixed amount of axial movement by the bush 17.

Namely, the increased diameter portion 23 of the bush 17 abuts against the inner wall portions 13a and 12a after a fixed amount of axial movement.

When the turbocharger 1 is operated, the nozzle vanes 16 are exposed to and thus heated by exhaust gas having a high temperature. The heat in the nozzle vanes 16 is then transferred to the bushes 17 via the corresponding shafts 18, and thus the bushes 17 are heated. As a result, the bushes 17 expand in both the axial and radial directions. At this time, in the present invention, the increased diameter portion 23 of the bushes 17 can freely expand in the axial direction. Consequently, since thermal stress does not occur in the increased diameter portion 23 of the bushes 17, there is no danger that the bushes 17 will be deformed, or that the increased diameter portion 23 of the bushes 17 will be damaged. In addition, dislodging of the bushes 17 from the bush insertion bores 21, 22 is prevented by the inner wall portion 13a of the annular flange 13 and by the inner wall portion 12a of the backplate 12.

Figure 5:
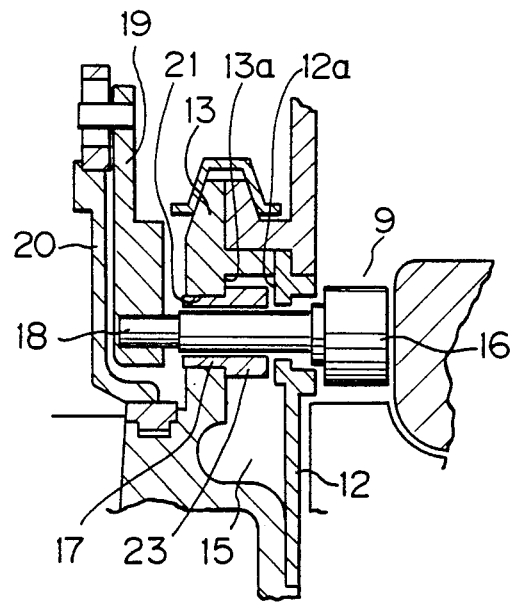
FIG. 5 is a cross-sectional side view of a second embodiment according to the present invention.

In a second embodiment of the present invention, illustrated in FIG. 5, the bush 17 is inserted into only the bush insertion bore 21 formed in the annular flange 13. Consequently, in this embodiment, the bush 17 is supported by only the annular flange 13.

Figure 6:
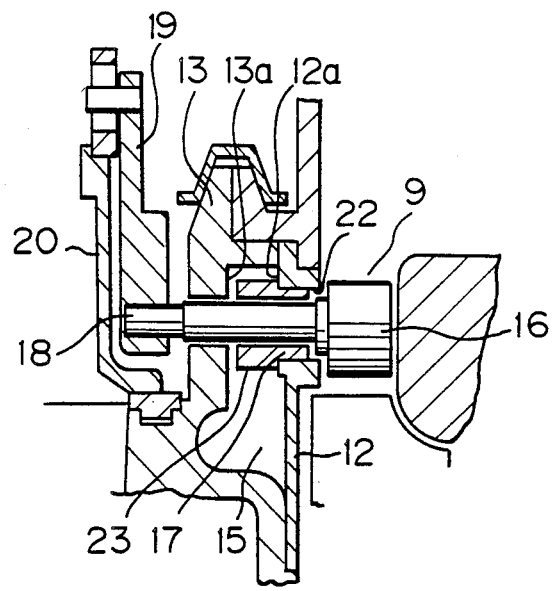
FIG. 6 is a cross-sectional side view of a third embodiment according to the present invention.

In a third embodiment of the present invention, illustrated in FIG. 6, the bush 17 is inserted into only the bush insertion bore 22 of the backplate 12. Consequently, in this embodiment, the bush 17 is supported by only the backplate 12.

Also in the embodiments illustrated in FIGS. 5 and 6, the bush 17 has an axial length slightly shorter than the distance between the inner wall portion 13a of the annular flange 13 and the inner wall portion 12a of the backplate 12. Consequently, the increased diameter portion 23 of the bush 17 is able to move freely in the axial direction, and dislodging of the bush 17 from the bush insertion bore 21 or 22 is prevented by the inner wall portion 13a of the annular flange 13 and by the inner wall portion 12a of the backplate 12.

Figure 7:
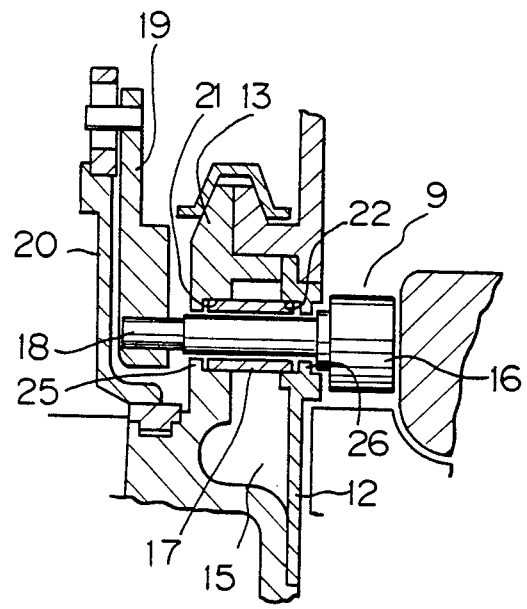
FIG. 7 is a cross-sectional side view of a fourth embodiment according to the present invention.

In a fourth embodiment of the present invention, illustrated in FIG. 7, the bush 17 has a uniform outer diameter over the entire length thereof. In this embodiment, annular projections 25 and 26 are formed on the inner walls of the bush insertion bores 21 and 22, respectively, and the bush 17 has an axial length slightly shorter than the distance between the annular projections 25 and 26. These annular projections 25 and 26 function as stop members which allow a fixed amount of axial movement by the bush 17.

Figure 8:
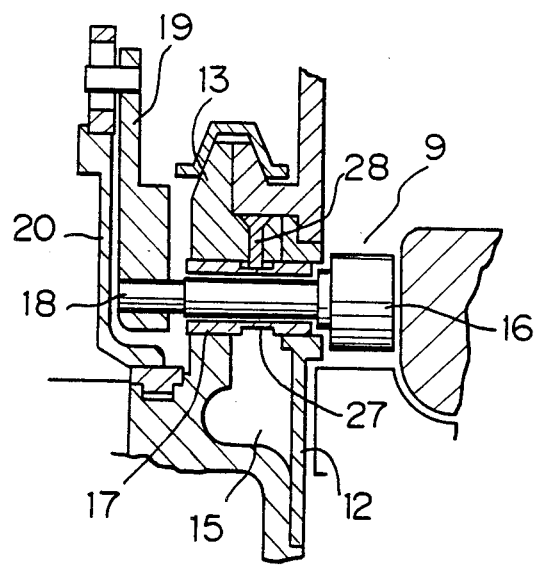
FIG. 8 is a cross-sectional side view of a fifth embodiment according to the present invention.

In a fifth embodiment of the present invention illustrated in FIG. 8, an annular groove 27 is formed on the outer peripheral wall of the bush 17, which has a uniform outer diameter, and a pin 28 engaging with the annular groove 27 is attached to the annular flange 13. This pin 28 functions as a stop member which allows a fixed amount of axial movement by the bush 17.

According to the present invention, since the bush for supporting the shaft of the nozzle vane is able to freely expand in the axial direction and is prevented from being dislodged from the bush insertion bore, an excessively high thermal stress does not occur in the bush. Consequently, there is no danger that the bush will be deformed and thereby prevent a smooth rotation of the shaft of the nozzle vane. In addition, there is also no danger that a portion of the bush will be damaged and, thereby, the bush will be dislodged from the bush insertion bore.

While the invention has been described by reference to specific embodiments chosen for purposes of illustration, it should be apparent that numerous modifications could be made thereto by those skilled in the art without departing from the basic concept and scope of the invention.

I claim:

1. A turbocharger comprising:

a center housing having a radially outwardly extending annular flange at one end thereof;

a turbine housing fixed to said annular flange and having an exhaust gas inflow chamber therein;

a turbine wheel rotatably arranged in said turbine housing;

a radially outwardly extending backplate arranged between said turbine wheel and said one end of said center housing and having an outer peripheral portion held between said annular flange and said turbine housing;

an annular exhaust gas inlet passage formed between said backplate and said turbine housing and radially inwardly extending from said exhaust gas inflow chamber toward said turbine wheel;

a plurality of guide vanes rotatably arranged in said annular exhaust gas inlet passage, each of said guide vanes having a shaft which extends through both said backplate and said annular flange and projects beyond an exterior surface of said annular flange, said annular flange having a plurality of first bores formed therein to accommodate said shafts, said backplate having a plurality of second bores formed therein to accommodate said shafts, each of said first bores being aligned with said corresponding second bore;

a plurality of axially extending bushes each being received and mounted in at least one of a said first bore and a respective said corresponding second bore and rotatably supporting a corresponding said shaft therein; and stop means effectively based on at least one of said backplate and said annular flange, this stop means having two axially oppositely-facing shoulder means arranged for cooperating with said bushes, by being normally spaced from a respective at least one of two respective axially oppositely-facing shoulder means provided on each of said bushes, but being arranged to engage said oppositely-facing shoulder means provided on said bushes, for restricting axial movement of said bushes upon thermal expansion and contraction of said bushes, to an amount which is too small to permit said bushes becoming dislodged from reception and mounting in respective of said at least one first bore and corresponding second bore, but which is sufficiently great as to prevent damaging deformation of said bushes between said backplate and said annular flange.

2. A turbocharger according to claim 1, wherein each of said bushes has an increased diameter portion formed on an outer circumferential wall thereof and which provides said axially oppositely-facing sholders of the respective said bush at axially opposite ends thereof, said stop means comprising axially oppositely-facing shoulders respectively provided on an inner wall portion of said annular flange and an inner wall portion of said backplate, said inner wall portions being arranged on axially opposite sides of said increased diameter portion and being engageable with said shoulders of said increased diameter portion.

3. A turbocharger according to claim 2, wherein a heat insulation space is formed between said annular flange and said backplate, said increased diameter portion being located in said heat insulation space.

4. A turbocharger according to claim 2, wherein said increased diameter portion is formed on an axially central portion of said outer circumferential wall of each respective bush, and each of said bushes has one end axially slidably fitted into a respective said first bore and another end axially slideably fitted into a corresponding said second bore.

5. A turbocharger according to claim 2, wherein each of said bushes has one end portion forming said increased diameter portion and another end portion axially slideably fitted into a respective said first bore.

6. A turbocharger according to claim 2, wherein each of said bushes has one end portion forming said increased diameter portion thereon and another end portion axially slidingly fitted into a respective said second bore.

7. A turbocharger according to claim 1, wherein each of said bushes has a substantially uniform outer diameter over the entire length thereof and is movably inserted into both a respective said first bore and a corresponding said second bore, said stop means comprising respective shoulders formed on annular projections formed on inner walls of said first bores and said second bores and engageable with respective shoulders of respective of said bushes.

8. A turbocharger according to claim 7, wherein a heat insulating space is formed between said annular flange and said backplate, each of said bushes having a central outer peripheral wall portion exposed to said heat insulation space.

9. A turbocharger according to claim 1, wherein each of said bushes has a substantially uniform outer diameter over the entire length thereof and has a circumferentially extending groove formed on an outer circumferential wall thereof so that opposite flanks of said groove define said shoulders of the respective said bushes, said shoulders of said stop means being arranged to engage said shoulders of said bushes in respective ones of said annular grooves.

10. A turbocharger according to claim 9, wherein, for each said bush, said stop means comprises a pin supported by said annular flange and providing said shoulders of said stop means.

11. A turbocharger according to claim 9, wherein said annular groove is formed on an axially central portion of said outer circumferential wall, and each of said bushes is axially slidably fitted into both a respective said first bore and a corresponding said second bore.

* * * * *